(12) United States Patent  (10) Patent No.: US 7,154,906 B2
Ando  (45) Date of Patent: Dec. 26, 2006

(54) IMAGE PROCESSING APPARATUS, IMAGE PROCESSING METHOD, IMAGE PROCESSING PROGRAM, AND COMPUTER-READABLE STORAGE MEDIUM STORING IMAGE PROCESSING PROGRAM CODE

(75) Inventor: Tsutomu Ando, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 995 days.

(21) Appl. No.: 10/052,376

(22) Filed: Jan. 23, 2002

(65) Prior Publication Data

US 2002/0101933 A1    Aug. 1, 2002

(30) Foreign Application Priority Data

Jan. 30, 2001 (JP) ............................. 2001-021978

(51) Int. Cl.
*H04J 3/16* (2006.01)
*H04J 3/04* (2006.01)

(52) U.S. Cl. ...................... 370/465; 370/535
(58) Field of Classification Search ............... None
See application file for complete search history.

(56) References Cited

U.S. PATENT DOCUMENTS 5,367,522 A * 11/1994 Otani ..................... 370/468
5,995,490 A * 11/1999 Shaffer et al. ............ 370/260
6,020,915 A *  2/2000 Bruno et al. ............ 348/14.09
6,072,832 A *  6/2000 Katto .................... 375/240.28
6,128,649 A * 10/2000 Smith et al. ............... 709/217
6,151,066 A * 11/2000 Ito ........................... 348/169
6,339,592 B1 *  1/2002 Fugino et al. ............. 370/352
6,445,411 B1 *  9/2002 Shibata et al. .......... 348/211.99
6,493,878 B1 * 12/2002 Kassatly .................... 725/144
6,529,231 B1 *  3/2003 Yoshida .................. 348/14.08
6,718,119 B1 *  4/2004 Fujinami .................... 386/52
6,735,344 B1 *  5/2004 Boon ........................ 382/243
6,967,958 B1 * 11/2005 Ono et al. ................ 370/401

FOREIGN PATENT DOCUMENTS

JP      8-84331      3/1996
JP     11-177436     7/1999

* cited by examiner

*Primary Examiner*—Andrew C. Lee
(74) *Attorney, Agent, or Firm*—Fitzpatrick, Cella, Harper & Scinto.

(57) ABSTRACT

A natural-image signal obtained by encoding a natural image is input. An artificial-image signal obtained by encoding an artificial image is input. The natural-image signal and the artificial-image signal are adaptively multiplexed according to the communication status of a communication network, and the resulting multiplexed signal is transmitted via the communication network.

24 Claims, 9 Drawing Sheets

IMAGE PROCESSING APPARATUS, IMAGE PROCESSING METHOD, IMAGE PROCESSING PROGRAM, AND COMPUTER-READABLE STORAGE MEDIUM STORING IMAGE PROCESSING PROGRAM CODE

BACKGROUND OF THE INVENTION

1. Field of the Invention

The present invention relates to an image processing apparatus, an image processing method, an image processing program, and a computer-readable storage medium storing image processing program code, and more particularly, to image-data sending/receiving processing according to the traffic on a communication network.

2. Description of the Related Art

Cellular telephones (or portable terminals) are now being widely used. FIG. 1 illustrates a typical example of a communication system using portable terminals.

In FIG. 1, portable terminals 401 and 405 each include a display unit, an operation unit, and a communication controller, and communicate with a relay device (base station) 403 via communication channels 402 and 404.

Modulation methods are rapidly shifting towards the use of digital data rather than analog data, and portable terminals are being increasingly used not only as telephones for sending and receiving audio data, but also as portable terminals for sending and receiving data. Additionally, along with increases in the transmission rate, video (moving pictures) can be sent and received, which is impossible in the known art, and it is expected that such portable terminals will be used as video phones.

FIG. 2 is a block diagram illustrating a known video phone system. In FIG. 2, a video camera 501 captures an image of, for example, a character, and outputs a video signal. A microphone 504 receives sound and outputs an audio signal.

Analog-to-digital (A/D) converters 502 and 505 convert the signals output from the video camera 501 and the microphone 504, respectively, into digital signals.

A video encoder 503 encodes the digital video signal output from the A/D converter 502 according to a known compression/encoding method, and an audio encoder 506 encodes the digital audio signal output from the A/D converter 505 according to a known compression/encoding method. Generally, compressed and encoded data is referred to as a "bitstream".

A multiplexer 507 multiplexes the video bitstream and the audio bitstream so that they can be played back in synchronization with each other, thereby generating a single bitstream.

A demultiplexer 508 demultiplexes the multiplexed bitstream into the video bitstream and the audio bitstream. Then, a video decoder 509 decodes the video bitstream, a digital-to-analog (D/A) converter 510 converts the digital video data into an analog signal, and a monitor 511 displays the decoded video signal.

An audio decoder 512 decodes the audio bitstream, a D/A converter 513 converts the digital audio data into an analog signal, and a speaker 514 outputs the decoded sound.

A communication controller 515 sends and receives the above-described bitstreams. Reference numeral 516 indicates a communication channel, which is a wireless channel in this example. A relay device (base station) 517 sends and receives data to and from portable terminals. Reference numeral 518 indicates a communication channel 518 via which the relay device 517 and the portable terminals communicate with each other. A synchronization controller 519 controls the video signal and the audio signal to be played back in synchronization with each other by using timing control information superposed on each bitstream.

In the above-described known video phone system, however, depending on the traffic on the communication network, pictures or sound may not be continuously received at a receiving side, thereby failing to properly transmit information.

SUMMARY OF THE INVENTION

Accordingly, in view of the above background, the present invention has been made in order to solve the above-described problem. It is an object of the present invention to provide an image processing apparatus and method for implementing data communication such that images can be transmitted and received continuously regardless of the traffic status on a communication network.

In order to achieve the above object, according to one aspect of the present invention, there is provided an image processing apparatus including: a natural-image input unit for inputting a natural-image signal obtained by encoding a natural image; an artificial-image input unit for inputting an artificial-image signal obtained by encoding an artificial image; and a transmitter for adaptively multiplexing the natural-image signal and the artificial-image signal according to a communication status of a communication network, and for transmitting a resulting multiplexed signal via the communication network.

According to another aspect of the present invention, there is provided an image processing apparatus for decoding a multiplexed signal obtained by adaptively multiplexing an encoded natural-image signal and an encoded artificial-image signal according to a communication status of a communication network. The image processing apparatus includes: a receiver for receiving the multiplexed signal; a separator for separating the received multiplexed signal into the natural-image signal and the artificial-image signal; a natural-image decoder for decoding the natural-image signal separated by the separator; and an artificial-image decoder for decoding the artificial-image signal separated by the separator.

According to still another aspect of the present invention, there is provided an image processing method including: a natural-image input step of inputting a natural-image signal obtained by encoding a natural image; an artificial-image input step of inputting an artificial-image signal obtained by encoding an artificial image; and a transmission step of adaptively multiplexing the natural-image signal and the artificial-image signal according to a communication status of a communication network, and transmitting a resulting multiplexed signal via the communication network.

According to a further aspect of the present invention, there is provided an image processing method for decoding a multiplexed signal obtained by adaptively multiplexing an encoded natural-image signal and an encoded artificial-image signal according to a communication status of a communication network. The image processing method includes: a receiving step of receiving the multiplexed signal; a separation step of separating the received multiplexed signal into the natural-image signal and the artificial-image signal; a natural-image decoding step of decoding the separated natural-image signal; and an artificial-image decoding step of decoding the separated artificial-image signal.

According to a yet further aspect of the present invention, there are provided a computer-readable storage medium in which computer-readable program code implementing the above-described image processing method is stored and program software for controlling a computer to execute the above-described image processing method.

Other objects, features, and advantages of the invention will become apparent from the following detailed description taken in conjunction with the accompanying drawings.

DESCRIPTION OF THE PREFERRED EMBODIMENTS

The present invention is described in detail below with reference to the accompanying drawings through illustration of preferred embodiments.

First Embodiment

Figure 3:
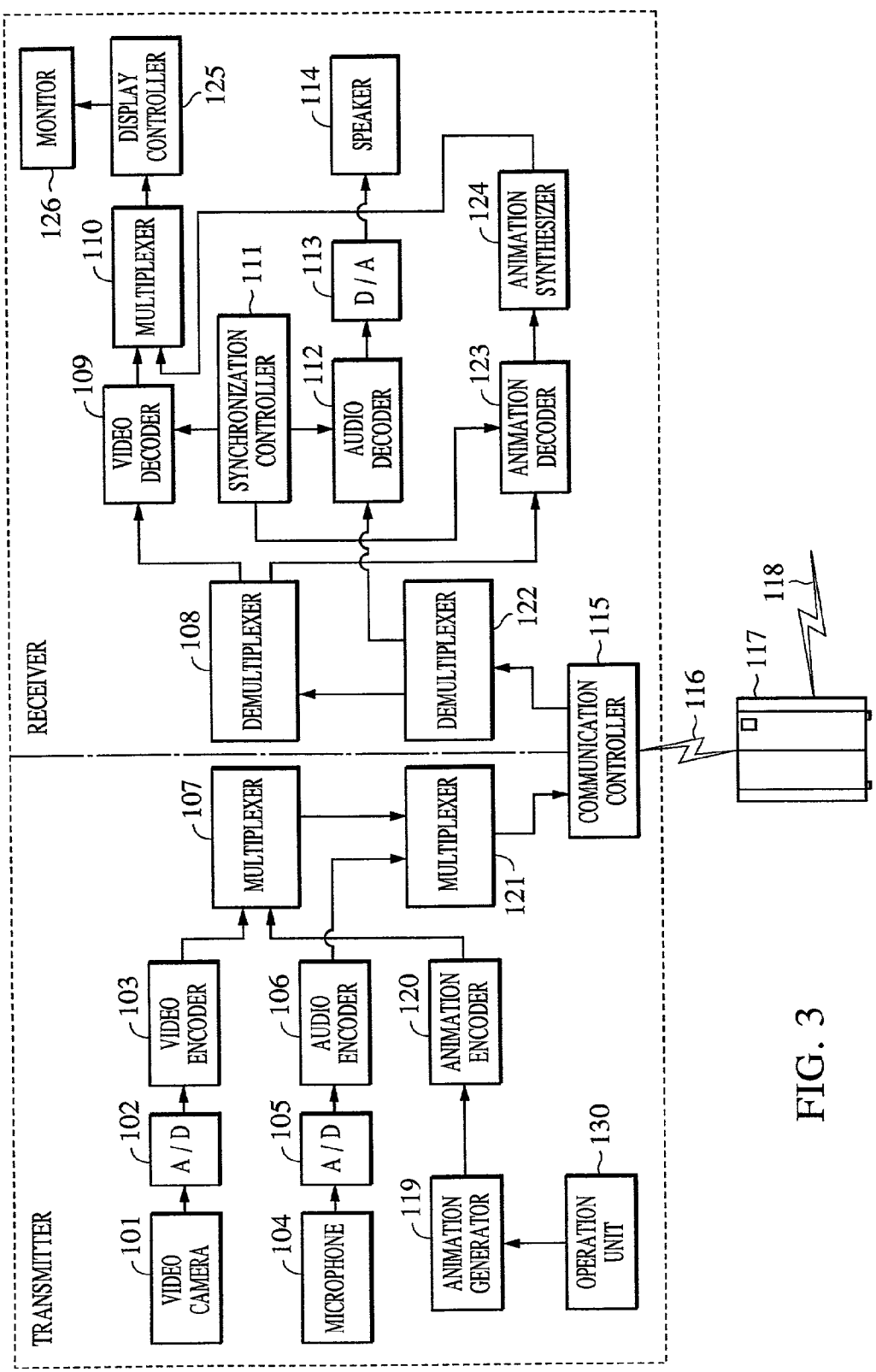
FIG. 3 is a block diagram illustrating the configuration of a video phone system according to a first embodiment of the present invention.

FIG. 3 is a block diagram illustrating the configuration of a video phone system according to a first embodiment of the present invention.

The video phone system includes a transmitter and a receiver. In FIG. 3, in the transmitter, a video camera 101 for capturing natural images and outputting video data (natural-image video data), an A/D converter 102, a video encoder 103, a microphone 104, an A/D converter 105, and an audio encoder 106 are similar to the video camera 501, the A/D converter 502, the video encoder 503, the microphone 504, the A/D converter 505, and the audio encoder 506, respectively, shown in FIG. 2, and an explanation thereof is thus omitted. The video encoder 103 performs encoding processing in compliance with, for example, the ISO/IEC 14496-2 (MPEG-4 Visual) standards.

Figure 1:
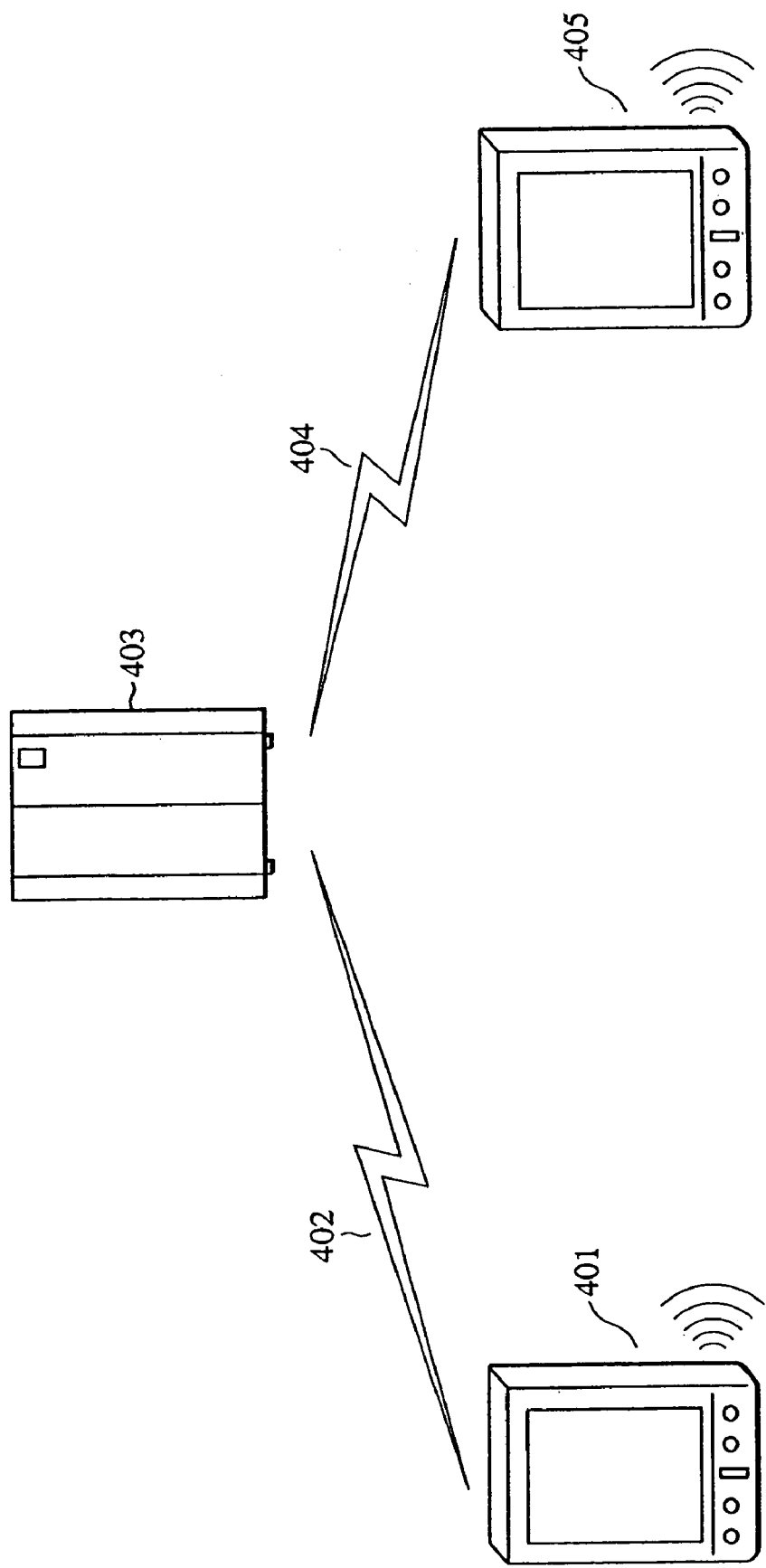
FIG. 1 illustrates an example of a communication system using portable terminals.
Figure 2:
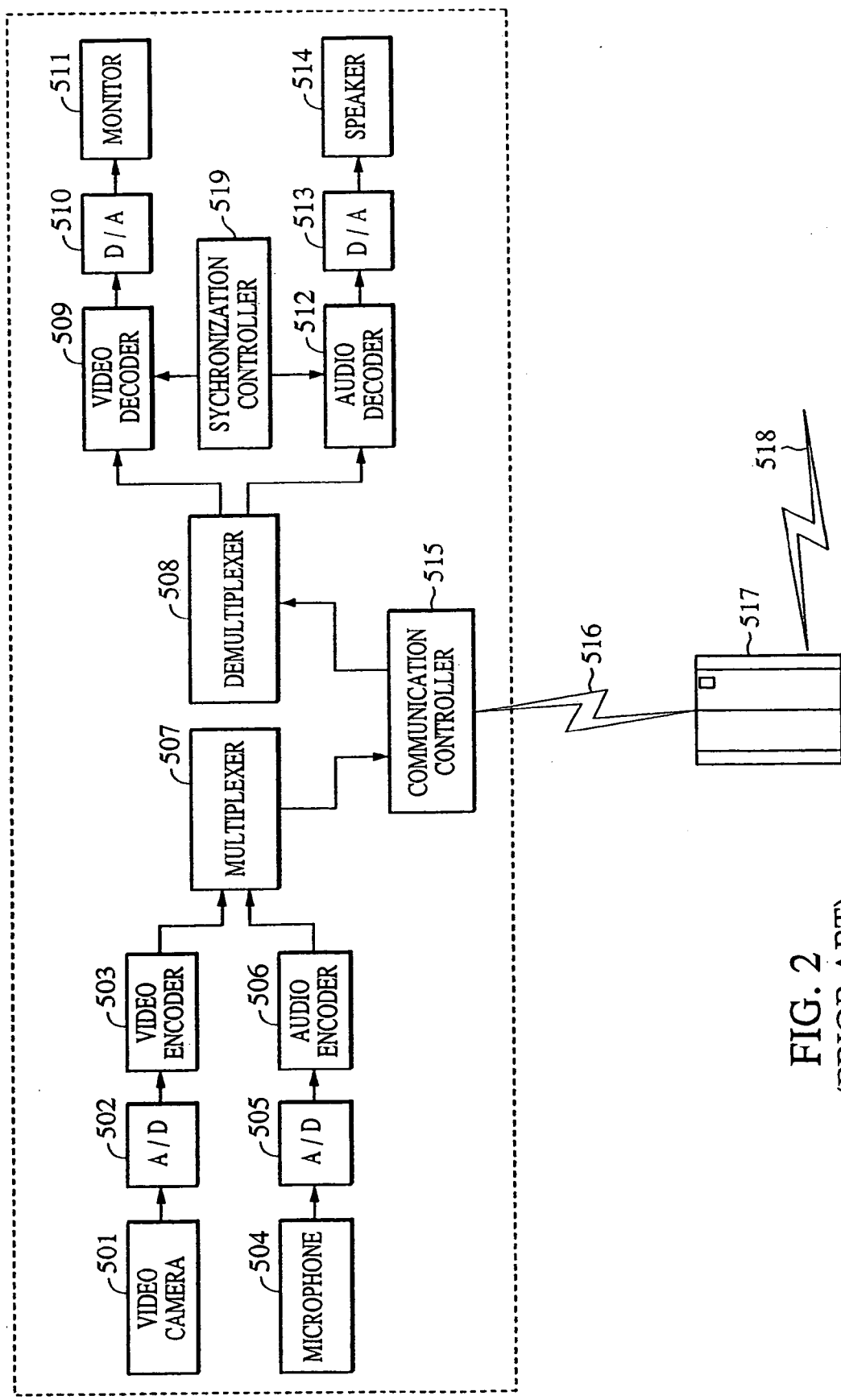
FIG. 2 is a block diagram illustrating the configuration of a known video phone system.

A communication controller 115, a communication channel 116, a relay device 117, and a communication channel 118 are also similar to the communication controller 515, the communication channel 516, the relay device 517, and the communication channel 518, respectively, shown in FIG. 2, and an explanation thereof is thus omitted.

An animation generator 119 in the transmitter generates animation data (artificial-image data) in response to instructions from an operation unit 130. The animation generator 119 generates graphical animation data (including skeleton data, movement data, and texture data, which will be discussed below) obtained by simulating, for example, the expression of a face and the movement of hands. A technique for creating animation is described below.

An animation encoder 120 compresses and encodes the animation data generated by the animation generator 119.

A multiplexer 107 adaptively selects the output of the video encoder 103 (video stream) and the output of the animation encoder 120 (animation stream) in response to instructions from the operation unit 130, and multiplexes the video stream and the animation stream, thereby outputting an image stream.

A multiplexer 121 multiplexes the image stream output from the multiplexer 107 and an audio stream output from the audio encoder 106, and supplies a multiplexed data steam to the communication controller 115.

In the receiver, a demultiplexer 122 demultiplexes the data stream input from the communication controller 115 into an image stream consisting of the video data and/or the animation data and an audio stream based on attribute information stored in the header of the data stream.

A demultiplexer 108 demultiplexes the video data and the animation data from the image stream based on attribute information stored in the header of the image stream.

The video data, the animation data, and the audio data are decoded by a video decoder 109, an animation decoder 123, and an audio decoder 112, respectively. A D/A converter 113 converts the audio data decoded by the audio decoder 112 into analog data. A speaker 114 outputs the analog audio data.

An animation synthesizer 124 processes the animation data decoded by the animation decoder 123 by synthesizing, for example, the face and the hands of a character image. A synchronization controller 111 controls the video data or the animation data to be synchronized with the audio data.

A multiplexer 110 determines how the video data and/or the animation data have been multiplexed and transmitted in the transmitter, and synthesizes the video data and the animation data based on the result of the determination, thereby outputting synthesized image data to a display controller 125. Details of the multiplexer 110 are given below. The video data and/or the animation data are displayed on a monitor 126.

In the first embodiment, the type of image to be synthesized from video data (natural image) and animation data (artificial image) can be selected from a plurality of types by the operation unit 130. Examples of the types of synthesized images are shown in FIGS. 4A through 4D.

Figure 4A:
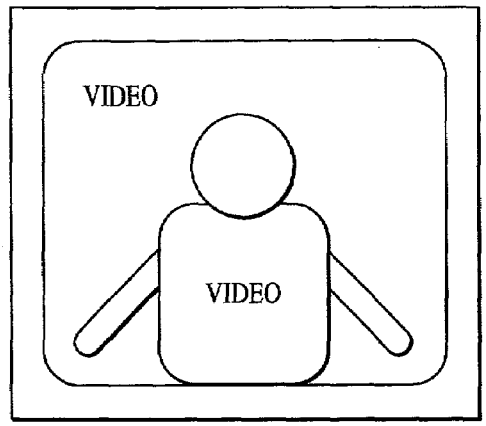
FIGS. 4A through 4D illustrate examples of synthesized images.
Figure 4C:
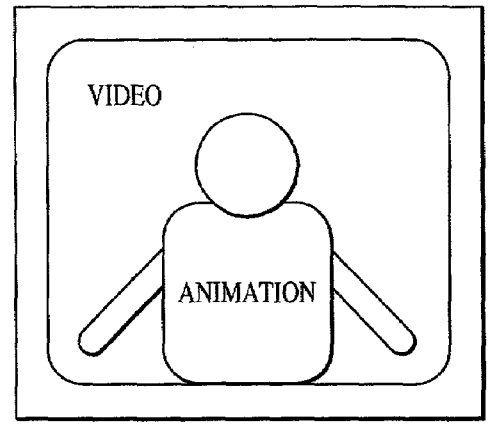
Figure 4B:
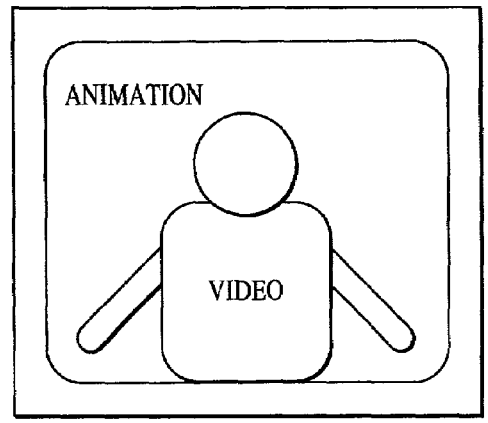
Figure 4D:
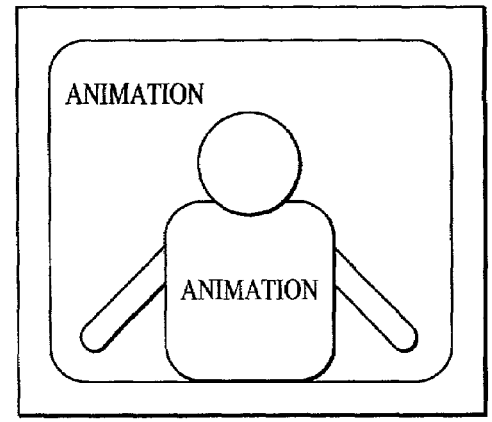

FIG. 4A illustrates a synthesized image using only video data (natural image) output from the video camera 101 for both the background image and the character image. FIG. 4B illustrates a synthesized image using animation data (artificial image) generated by the animation generator 119 for the background image and using video data output from the video camera 101 for the character image. FIG. 4C is a synthesized image using video data output from the video camera 101 for the background image and using animation data generated by the animation generator 119 for the character image. FIG. 4D is a synthesized image using only animation data generated by the animation generator 119 for both the background image and the character image.

Figure 5:
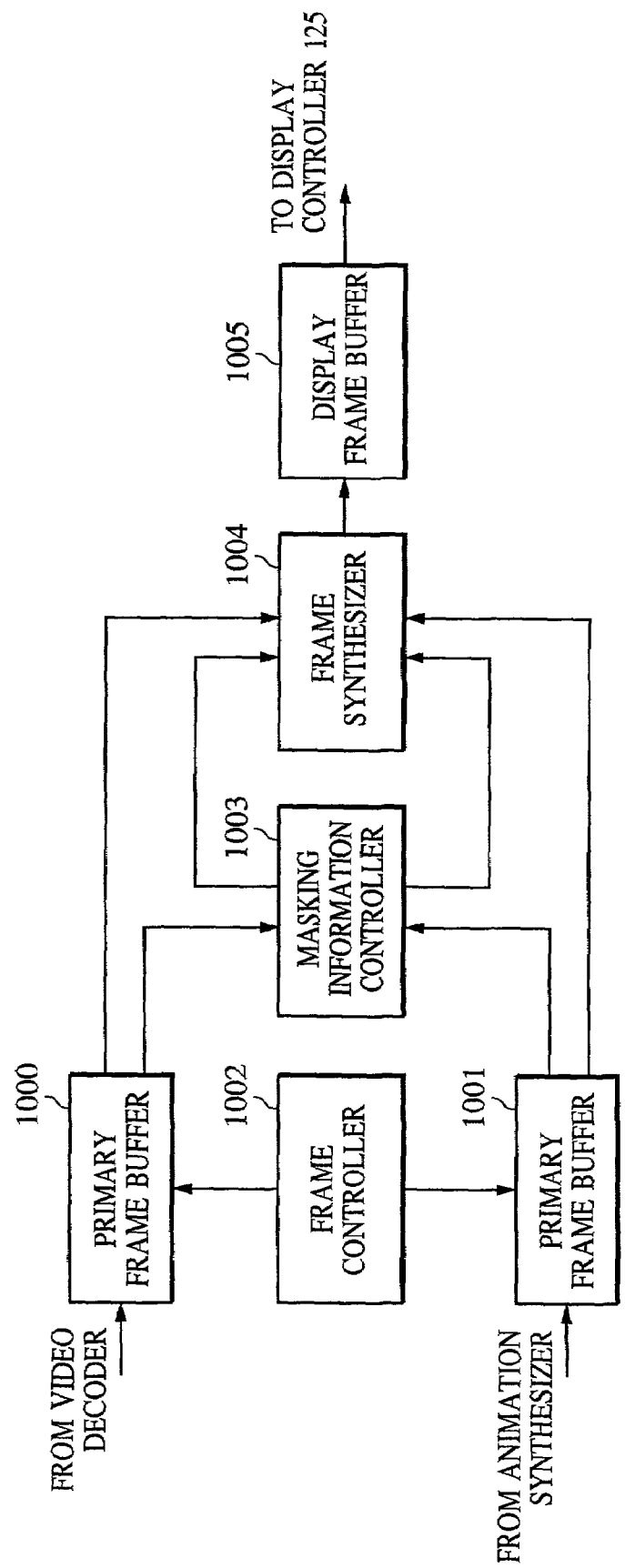
FIG. 5 is a block diagram illustrating a detailed configuration of a multiplexer 110 shown in FIG. 3.

The synthesizing processing performed by the multiplexer 110 is described below with reference to FIG. 5.

Video data output from the video decoder 109 is temporarily stored in a primary frame buffer 1000. Normally, video data is two-dimensional pixel data handled in units of frames. In contrast, animation data using polygons is usually three-dimensional data. Thus, video data and animation data cannot be synthesized without further processing.

Accordingly, after animation data is generated in the animation synthesizer 124, it is temporarily stored in a two-dimensional primary frame buffer 1001, and then, rendering is performed on the animation data, thereby constructing frame data.

If the animation data is used for the background image (see FIG. 4B), it is combined with the video data used for the foreground image by using mask information of the video data (which is obtained by a masking information controller 1003) in units of frames. If the animation data is used for the foreground image (see FIG. 4C), a mask image is formed from a two-dimensional video image by performing rendering, and then, the animation data is combined with the video data based on the mask image.

The animation synthesizing speed is synchronized with the video playback speed in a frame controller 1002. The frame data formed in the primary frame buffers 1000 and 1001 and the mask information obtained by the masking information controller 1003 are input into a frame synthesizer 1004. Then, two frames (or a greater number of primary frames) are combined while suitably performing masking processing by using the mask information, and the resulting synthesized image is written into a display frame buffer 1005. As a result, a natural image consisting of video data and animation data can be output.

Figure 6:
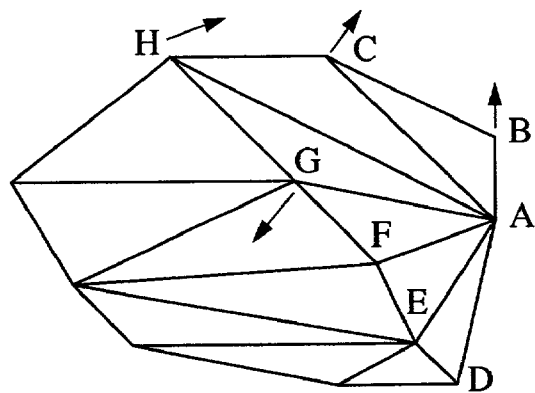
FIG. 6 illustrates a mesh representing a graphics skeleton.

The technique for creating animation data used in this embodiment is as follows. FIG. 6 illustrates a mesh indicating a graphics skeleton.

As stated above, the graphics skeleton is referred to as a "mesh". In the mesh shown in FIG. 6, each unit formed by connecting vertices (in the shape of a triangle in the example shown in FIG. 6) is generally referred to as a "polygon". For example, the portion formed by connecting vertices A, B, and C is defined as one polygon.

In order to construct the graphics shown in FIG. 6, it is necessary to indicate the coordinate values of the individual vertices and information concerning combinations of vertices (for example, vertices A, B, and C, vertices A, G, and H, and vertices A, E, and D). Although the above type of graphics is generally constructed in a three-dimensional space, the ISO/IEC 14496-1 (MPEG-4 Systems) defines the above type of configuration in a two-dimensional space.

In practice, image (pattern) data referred to as a "texture" is mapped onto each polygon of the graphics skeleton. This is referred to as "texture mapping". Then, a realistic-looking graphical model can be formed.

Motion can be added to the graphics object shown in FIG. 6 by changing the coordinate positions of the polygons over time, as indicated by the arrows shown in FIG. 6. If the directions and the magnitudes of the individual vertices are the same, a simple translation operation is implemented. By changing the magnitude and the direction for the individual vertices, motion and the transformation of the graphics object is possible.

If motion information concerning the individual vertices is constantly re-defined, the amount of data becomes large. Accordingly, only a difference in motion vectors of each vertex is recorded, or the translation time and the translation locus are pre-defined, and an object is automatically animated along the locus in an animation device according to predetermined rules.

Figure 7:
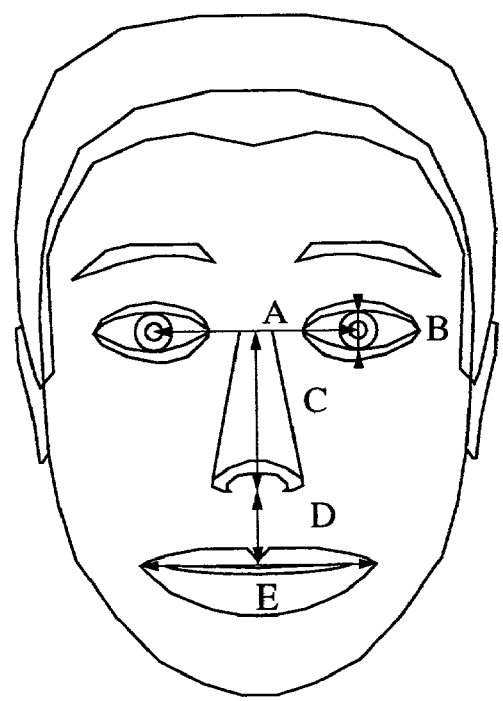
FIG. 7 illustrates an example of a face image model.

The animation creating technique is more specifically discussed below in the context of a face image. FIG. 7 illustrates an example of a face image model.

Unlike a general graphics object, a face model has common features concerning the eyes, the nose, etc. The model shown in FIG. 7 is formed of parameters consisting of A: the distance between the center of one eye to the center of the other eye, B: the vertical length of the eyes, C: the vertical length of the nose, D: the length from the bottom line of the nose to the top line of the mouth, and E: the horizontal length of the mouth.

By preparing a plurality of sets of parameters and a plurality of corresponding textures, a template set for face animation can be formed. As stated above, in a face image, there are many common feature points representing, for example, the corners of the eyes, and the corners of the mouth. By changing the positions of the feature points, many facial expressions can be created.

For example, by providing commands, such as "lower the position of the feature points representing the corners of the eyes" (in practice, configuration data near the feature points are also changed), and "lift the positions representing the corners of the mouth", a "smiling" expression can be created.

Accordingly, the number of bits per unit time required for transmitting graphics data is smaller than that for transmitting moving pictures.

The above-described animation creating technique is also applicable to a body image, as well as a face image. More specifically, feature-point data representing, for example, joints for the hands and the feet, is extracted, and motion information is added to the extracted data, thereby making it possible to animate actions, such as "walking" or "lifting a hand", with a small amount of data.

According to the first embodiment, a data stream obtained by suitably combining video data and animation data in one screen can be sent and received in response to user instructions. Thus, the bit rate of the data stream can be controlled by changing the ratio of the video data to the animation data to be synthesized. With this arrangement, the data stream can be sent and received according to the traffic status.

Second Embodiment

Figure 8:
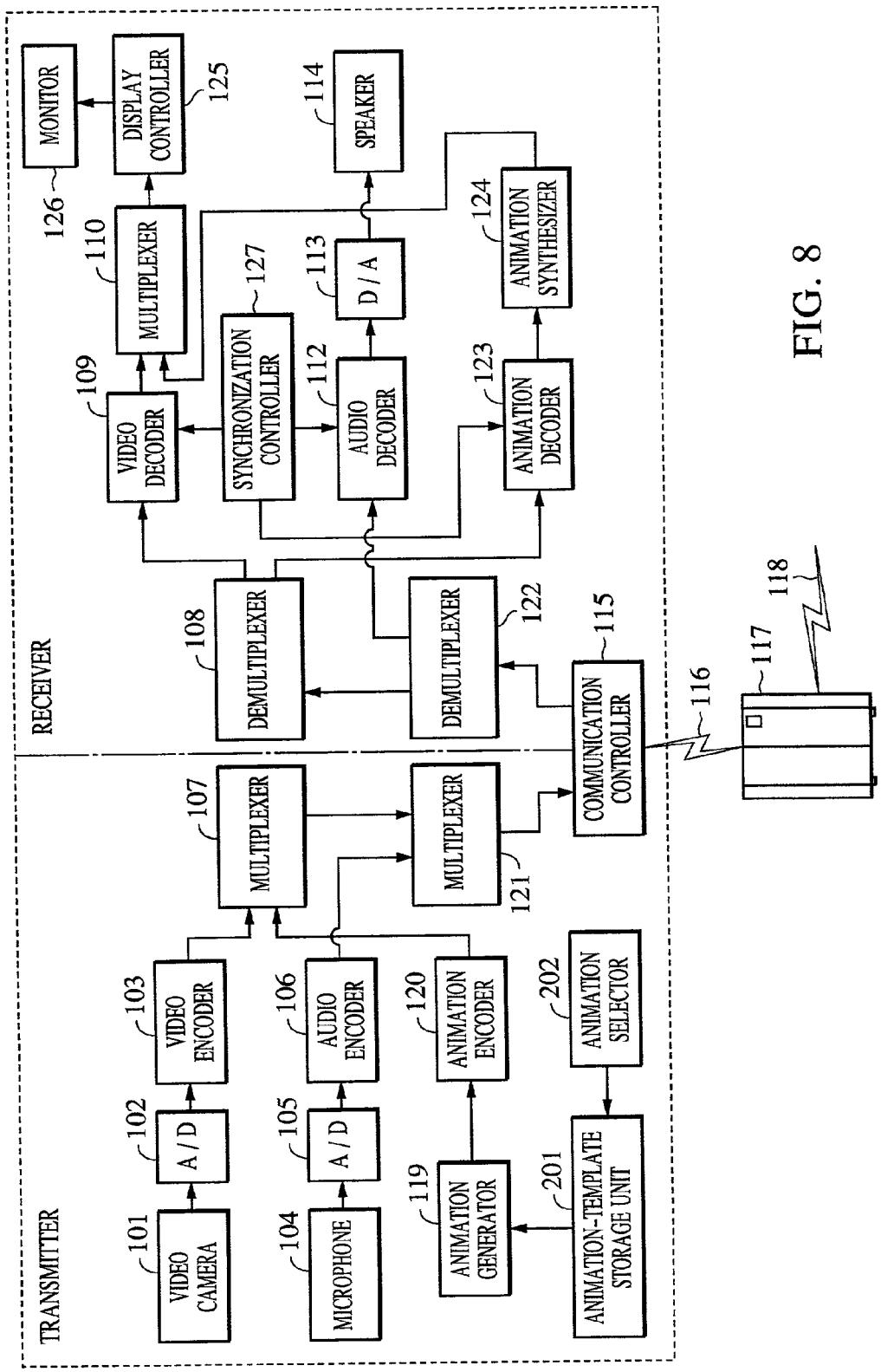
FIG. 8 is a block diagram illustrating the configuration of a video phone system according to a second embodiment of the present invention.

FIG. 8 is a block diagram illustrating the configuration of a video phone system according to a second embodiment of the present invention. In FIG. 8, the elements having the same functions as those shown in FIG. 3 are designated with like reference numerals, and an explanation thereof is thus omitted.

In FIG. 8, an animation-template storage unit 201 stores template information (skeleton, complexion, hair-style, with or without glasses) for face animation data. An animation selector 202 selects the animation template and the animation pattern (such as "waving a hand" or "lowering the head") according to the user's taste.

That is, in the second embodiment, a plurality of templates for animation data are prepared, and the user suitably selects a desired template so as to create animation data and transmit it.

According to the second embodiment, the user is able to easily create animation having a desired motion, and a data stream obtained by suitably combining video data and the created animation data in one screen can be sent and received in response to user instructions. Thus, the bit rate of the data stream can be controlled by changing the ratio of the video data to the animation data. As a result, the data stream can be sent and received according to the traffic status.

Third Embodiment

Figure 9:
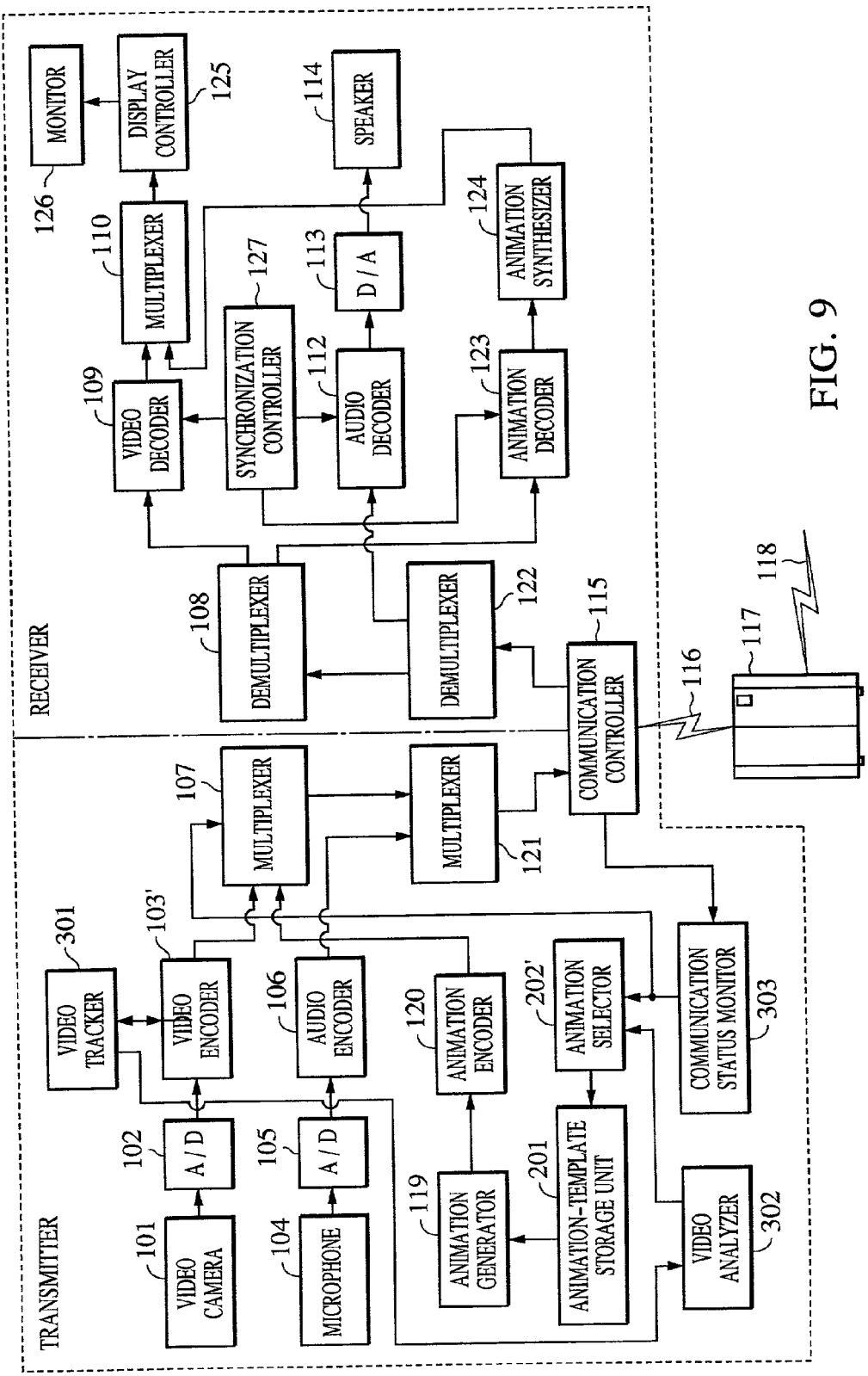
FIG. 9 is a block diagram illustrating the configuration of a video phone system according to a third embodiment of the present invention.

FIG. 9 is a block diagram illustrating the configuration of a video phone system according to a third embodiment of the present invention. In FIG. 9, the same elements having the same functions as those shown in FIG. 8 are indicated by like reference numerals, and an explanation thereof is thus omitted.

In FIG. 9, a video tracker 301 is a device for identifying and extracting a certain object (for example, a face) from video data by using a suitable method.

A video analyzer 302 analyzes the object image extracted by the video tracker 301 so as to analyze the individual objects forming the video data, and supplies the analysis result to an animation selector 202'.

For example, in analyzing a human being, the video analyzer 202' analyzes the contour of the face, the positions of the eyeballs, the position of the mouth, etc.

A communication status monitor 303 monitors the communication status (such as the effective bit rate and the traffic congestion) of the communication channel, and controls animation to be generated, the animation data to be adaptively multiplexed with the video data, and the synthesized bitstream to be transmitted according to the communication status.

Figure 10:
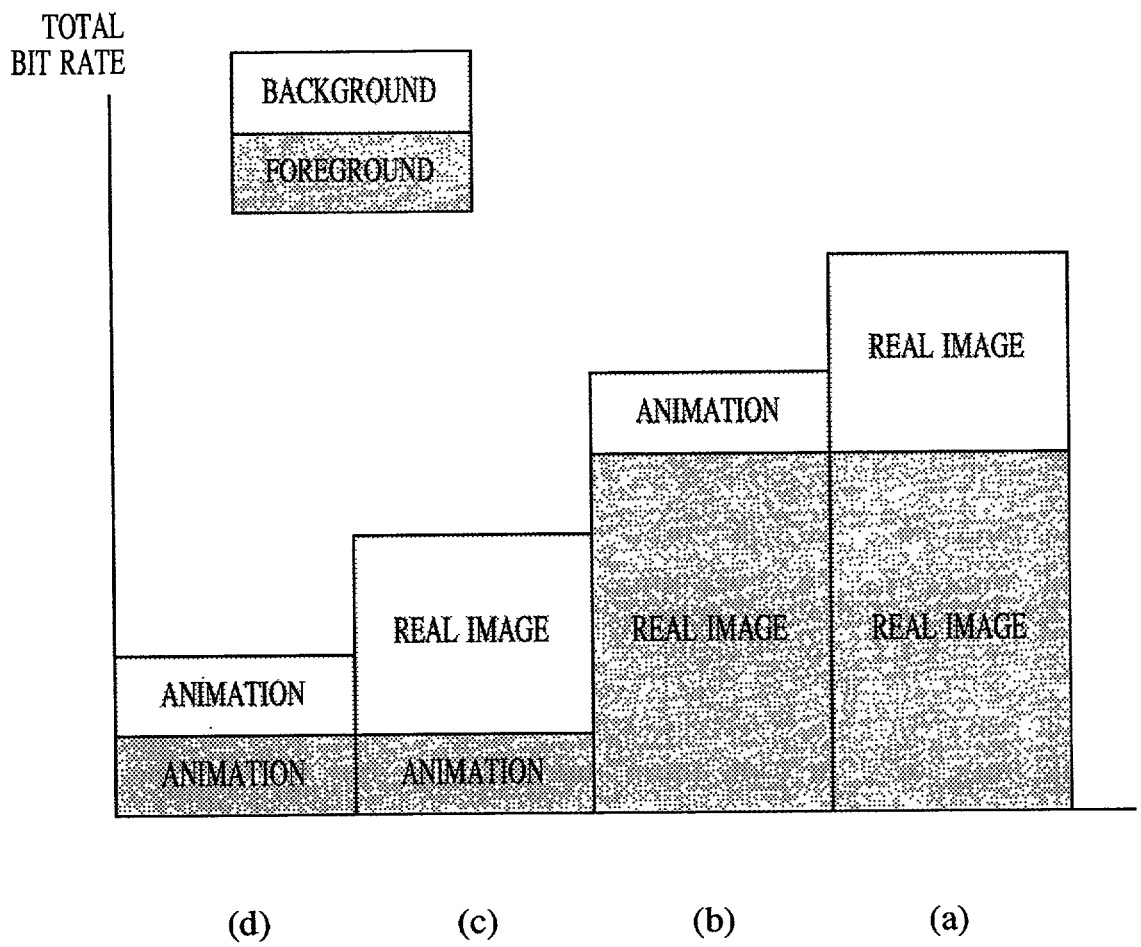
FIG. 10 illustrates the total bit rate when video data and animation data are synthesized so as to form the synthesized images shown in FIGS. 4A through 4D.

The synthesizing processing of video data and animation data according to the communication status is discussed below with reference to FIGS. 4A through 4D. In FIGS. 4A through 4D, it is assumed that the foreground image (character) is moving rapidly and the background image is stationary. FIG. 10 illustrates the total bit rate when video data and animation data are combined so as to form the synthesized images shown in FIGS. 4A through 4D. In FIG. 10, (a), (b), (c), and (d) respectively correspond to the images shown in FIGS. 4A, 4B, 4C, and 4D.

In this embodiment, When the communication status is good (for example, higher bit-rate data can be sent and received since a data channel is unoccupied), only video images are used (FIG. 4A or (a) of FIG. 10), and as the communication status becomes worse (for example, only lower bit-rate data can be sent and received since a data channel becomes congested), the synthesizing processing is adaptively and automatically controlled to form a synthesized image according to the ratio of the video data to the animation data in the order of FIG. 4B, 4C, and 4D, or (b), (c), and (d) of FIG. 10.

The animation selector 202' selects the animation template according to the result obtained from the communication status monitor 303 and the video analyzer 302, thereby generating realistic-looking animation.

As described above, video data and animation data are combined to form one screen with a suitable ratio (see FIGS. 4A through 4D) according to the communication status (the ratio of the video data to the animation data changes according to the communication status). Additionally, sound can also be transmitted according to the user's taste.

According to the third embodiment, video data and animation data can be adaptively multiplexed and transmitted according to the communication status, thereby preventing interruptions of images or sound at the receiving side.

The bit rate of the animation data itself can also be reduced by dynamically decreasing the resolution of a mesh forming the animation data. By using this technique, the bit rate can be further reduced according to the traffic status.

Software program code for implementing the functions of the foregoing embodiments may be supplied, and may be executed by a program stored in a computer (or a CPU or an MPU). The present invention also encompasses such a modification.

In this case, the program code itself implements the novel functions of the foregoing embodiments. Accordingly, the program code itself, and means for supplying such program code to the computer, for example, a storage medium storing such program code, constitute the present invention. Examples of the storage medium for storing and supplying the program code include a floppy disk, a hard disk, an optical disc, a magneto-optical disk, a compact disc read only memory (CD-ROM), a CD-recordable (CDR), a magnetic tape, a non-volatile memory card, and a read only memory (ROM).

In other words, the foregoing description of the embodiments has been given for illustrative purposes only and is not to be construed as imposing any kind of limitation.

The scope of the invention is, therefore, to be determined solely by the following claims and not limited by the text of the specification and alterations made within a scope equivalent to the scope of the claims fall within the true spirit and scope of the invention.

What is claimed is:

1. An image processing apparatus comprising:
    a) natural-image input means for inputting a natural-image signal obtained by encoding a natural image;
    b) artificial-image input means for inputting an artificial-image signal obtained by encoding an artificial image; and
    c) transmission means for adaptively multiplexing the natural-image signal and the artificial-image signal according to a communication status of a communication network, and for transmitting a resulting multiplexed signal via the communication network.

2. An apparatus according to claim 1, wherein said transmission means transmits the natural-image signal when the communication network is unoccupied, and transmits the artificial-image signal when the communication network is congested.

3. An apparatus according to claim 1, wherein said transmission means multiplexes the natural-image signal and the artificial-image signal so that one screen includes the natural image and the artificial image, and transmits the resulting multiplexed image.

4. An apparatus according to claim 1, wherein said transmission means changes a ratio of the natural image to the artificial image to be multiplexed in one screen according to the communication status.

5. An apparatus according to claim 1, wherein the artificial-image signal is substituted for an object image forming the natural-image signal.

6. An apparatus according to claim 1, wherein said natural-image input means comprises image pick-up means for capturing a subject image, and encoding means for encoding the natural-image signal of the subject image captured by said image pick-up means.

7. An apparatus according to claim 1, wherein said artificial-image input means comprises storage means for storing a plurality of types of model data for generating the artificial-image signal, and selector means for selecting a desired type of model data from the plurality of types of model data.

8. An apparatus according to claim 1, further comprising audio-signal input means for inputting an audio signal, wherein said transmission means also multiplexes the audio signal, and transmits the multiplexed audio signal.

9. An apparatus according to claim 6, wherein said encoding means encodes the natural-image signal according to an MPEG-4 system.

10. An apparatus according to claim 1, wherein the artificial-image signal is an animation image.

11. An image processing apparatus for decoding a multiplexed signal obtained by adaptively multiplexing an encoded natural-image signal and an encoded artificial-image signal according to a communication status of a communication network, said image processing apparatus comprising:
  a) receiving means for receiving the multiplexed signal;
  b) separation means for separating the received multiplexed signal into the natural-image signal and the artificial-image signal;
  c) natural-image decoding means for decoding the natural-image signal separated by said separation means; and
  d) artificial-image decoding means for decoding the artificial-image signal separated by said separation means.

12. An apparatus according to claim 11, further comprising synthesizing means for combining the natural-image signal decoded by said natural-image decoding means and the artificial-image signal decoded by said artificial-image decoding means so as to generate a synthesized image signal.

13. An apparatus according to claim 12, further comprising display means for displaying the synthesized image signal obtained by said synthesizing means.

14. An apparatus according to claim 11, wherein the multiplexed signal is obtained by multiplexing the natural-image signal and the artificial-image signal so that one screen includes the natural-image signal and the artificial-image signal.

15. An apparatus according to claim 11, wherein a ratio of the natural-image signal to the artificial-image signal in one screen is changed according to the communication status.

16. An apparatus according to claim 11, wherein the artificial-image signal is substituted for an object image forming the natural-image signal.

17. An apparatus according to claim 11, further comprising audio decoding means for decoding an encoded audio signal, wherein the encoded audio signal is multiplexed in the multiplexed signal, and said separation means separates the audio signal, and said audio decoding means decodes the separated audio signal.

18. An apparatus according to claim 11, wherein the artificial-image signal is an animation image.

19. An image processing method comprising:
  a) a natural-image input step of inputting a natural-image signal obtained by encoding a natural image;
  b) an artificial-image input step of inputting an artificial-image signal obtained by encoding an artificial image; and
  c) a transmission step of adaptively multiplexing the natural-image signal and the artificial-image signal according to a communication status of a communication network, and transmitting a resulting multiplexed signal via the communication network.

20. A computer-readable storage medium in which computer-readable program code for executing said image processing method set forth in claim 19 is stored.

21. Program software, stored in a computer-readable medium, for controlling a computer to execute said image processing method set forth in claim 19.

22. An image processing method for decoding a multiplexed signal obtained by adaptively multiplexing an encoded natural-image signal and an encoded artificial-image signal according to a communication status of a communication network, said image processing method comprising:
  a) a receiving step of receiving the multiplexed signal;
  b) a separation step of separating the received multiplexed signal into the natural-image signal and the artificial-image signal;
  c) a natural-image decoding step of decoding the separated natural-image signal; and
  d) an artificial-image decoding step of decoding the separated artificial-image signal.

23. A computer-readable storage medium in which computer-readable program code for executing said image processing method set forth in claim 22 is stored.

24. Program software, stored in a computer-readable medium, for controlling a computer to execute said image processing method set forth in claim 22.

* * * * *

UNITED STATES PATENT AND TRADEMARK OFFICE
CERTIFICATE OF CORRECTION

PATENT NO. : 7,154,906 B2
APPLICATION NO. : 10/052376
DATED : December 26, 2006
INVENTOR(S) : Ando It is certified that error appears in the above-identified patent and that said Letters Patent is hereby corrected as shown below:

COLUMN 1:
Line 67, "518" (second occurrence) should be deleted.

COLUMN 7:
Line 40, "When" should read -- when --.

COLUMN 8:
Line 15, "disc" should read -- disk --.

Signed and Sealed this

Eighteenth Day of September, 2007

JON W. DUDAS
*Director of the United States Patent and Trademark Office*